Patented May 6, 1952

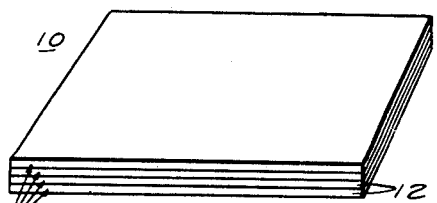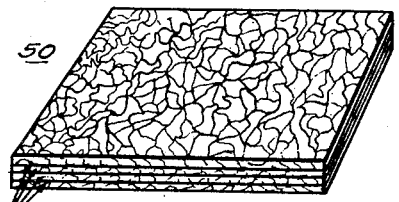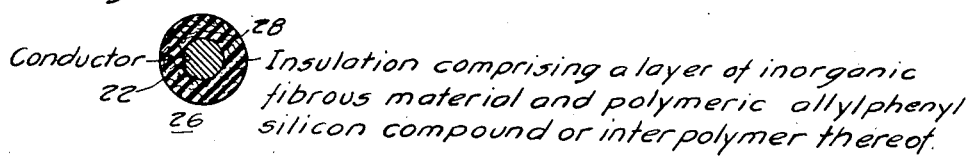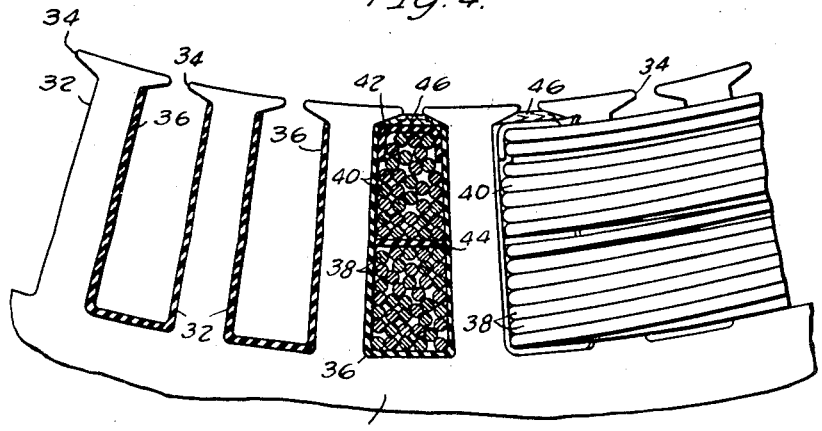

2,595,730

UNITED STATES PATENT OFFICE 2,595,730

ORGANOSILOXANES CONTAINING ALLYL RADICALS AND HEAT-TREATED PRODUCTS

Jack Swiss, McKeesport, and Clyde E. Arntzen, Pittsburgh, Pa., assignors to Westinghouse Electric Corporation, East Pittsburgh, Pa., a corporation of Pennsylvania Application March 9, 1945, Serial No. 581,839

7 Claims. (Cl. 260—46.5)

This inventon relates to organosilicon compounds, their preparation and use. More particularly, this invention is concerned with new and useful substances comprising organic compounds of silicon having both unsaturated and saturated organic groups attached to the silicon atom.

Heretofore there have been prepared organosilicon compounds having saturated alkyl and aryl groups attached to the silicon atom and polymerized through alternate silicon-oxygen bonds. These compounds and polymers are commonly known as silicones or siloxanes or organosilicon oxides. The organo-silicon oxides exhibit a number of properties superior to those possessed by most organic compounds and polymers, notably, a high thermal resistance. However, the polymerization reaction required to produce any predetermined solid silicone from a lower polymer entails an extremely long heat treatment at temperatures above those previously used in the art to cure and harden varnishes and resins. The use of organo-silicon oxides in many cases would require new heat-treating equipment, radical changes in processes, and would incur other disadvantages.

A more fundamental defect of the saturated organo-silicon oxides is that the flexible solid polymers lack oil and solvent resistance. When a strip of flexible organo-silicon oxide polymer is immersed in benzene or toluene it swells in a short time and, when removed from the solvent, readily crumbles when manipulated between the fingers. For many applications this shortcoming renders the saturated organo-silicon oxide polymers unusable.

The object of this invention is to provide for producing allylphenylsilicon compounds.

A further object of the invention is to provide for producing allylphenylsilicon ethoxides.

A further object of the invention is to provide for producing polymeric bodies embodying allylphenylsilicon compounds.

Another object of this invention is to provide for producing allylphenyl silicon oxides.

And other objects of the invention will, in part, be obvious and will, in part, appear hereinafter.

For a fuller understanding of the nature and objects of this invention, reference should be had to the following detailed description and drawing, wherein:

Figure 1 is a view in perspective of a laminated member impregnated with a polymerized allylphenylsilicon compound;

Figs. 2 and 3 are greatly enlarged views in cross section of conductors carrying an insulating coating of polymerized allyl-phenylsilicon compound;

Fig. 4 is a fragmentary view partly in section of a cross section of a dynamoelectric stator; and Fig. 5 is a view in perspective of a laminated sheet of mica flakes.

According to this invention, allylarylsilicon compounds are prepared; such compounds being capable of forming polymers both by polymerization through the allyl groups and through condensation to form alternate silicon-oxygen linkages. The unit structure of the compounds has the following generic formula:

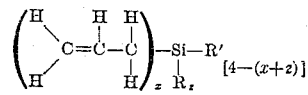

where $x$ and $z$ are a number from 1 to 2; the sum of $x$ and $z$ not exceeding 3, R represents an aryl group more specifically phenyl and the homologues thereof having chlorine, fluorine or alkyl groups substituted for nuclear hydrogen atoms; and R' represents chlorine, ethoxyl, hydroxyl or oxygen and the like. The substituted phenyl groups may be the mono-, di-, tri-, or higher chlorinated products up to the pentachlorophenyl. Likewise, one or more fluorine atoms may be attached to the phenyl group. Tolyl and xylyl are examples of alkyl substituted phenyl groups. Also two or more dissimilar substitutes selected from each of these may be attached to the phenyl radical.

As an example of these novel compounds, we have prepared allylphenylsilicon diethoxide and hydrolyzed the diethoxide to produce the corresponding silicol and by subsequent dehydration produced allyl phenyl silicon oxide polymers. The following illustrative examples are given in order that those skilled in the art may better understand how the present invention may be carried out.

Example 1

To a solution of 8.75 moles of ethyl silicate dissolved in 730 cc. of ethyl ether, a very dilute solution of allylmagnesium chloride dissolved in ethyl ether was added over a period of 42 hours. The allylmagnesium chloride was prepared by introducing allyl chloride slowly into a mass of magnesium shavings in ethyl ether. Approximately seven moles of allylmagnesium chloride so prepared was added to the ethyl silicate.

By means of distillation, a mixture of allyl-silicon ethoxide compounds was separated from the salts formed in the primary reaction. Fractional redistillation was applied to the distillate in order to separate the several allylsilicon ethoxide compounds. Relatively pure allylsilicon triethoxide, diallylsilicon diethoxide, and triallylsilicon ethoxide, as confirmed by subsequent chemical analyses, were recovered from the fractional redistillation treatment.

By varying the ratio of ethyl silicate to the allylmagnesium chloride, the proportion of allylsilicon triethoxide, diallylsilicon diethoxide and triallylsilicon ethoxide can be varied. The following is believed to represent the reaction:

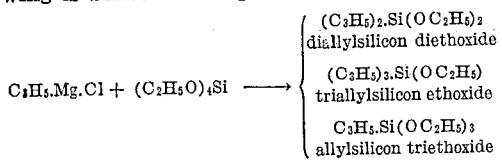

Allylmagnesium bromide can also be used in the reaction.

Example 2

For preparing allylphenylsilicon ethoxides from the allylsilicon ethoxides of Example 1, there was added to a mixture consisting of 2.0 gram moles of allylsilicon triethoxide, 171 cc. of ethyl ether, and 3 g. of magnesium over a period of nine hours, a very dilute solution of 1.33 gram moles of phenylmagnesium bromide in ethyl ether. The liquid which was recovered, by distillation at reduced pressure, was fractionally redistilled. The allylphenylsilicon diethoxide, which we have not found reported in the literature, thus obtained boiled at 116–120° C. at 10 mm. The index of refraction and the density were found to be $n_D^{25}$ 1.4822 and $d^{25}$ 0.9610, respectively.

The reaction is believed to proceed according to the following equations:

$$C_3H_5.Si(OC_2H_5)_3 + C_6H_5.Mg.Br \rightarrow$$
(allylsilicon triethoxide)

$$C_3H_5(C_6H_5)Si.(OC_2H_5)_2 + Mg(Br)OC_2H_5$$
(allylphenylsilicon diethoxide)

In a similar manner chlorophenyl, fluorophenyl and tolyl groups may be introduced to produce the corresponding allylaryl products. Likewise allyldiphenylsilicon ethoxide and diallylphenylsilicon ethoxide may be prepared by this synthesis.

The allylaryl organosilicon compounds may be prepared by reacting silicon tetrachloride with allylmagnesium chloride and reacting the resulting allylsilicon chlorides with a phenylmagnesium halide. In this latter case, the allylphenylsilicon halide compound will be produced. Such organosilicon halides may be subsequently reacted similarly to the ethoxides to produce silicols and silicones.

The allylphenylsilicon ethoxides can be polymerized directly to form resinous bodies. The polymerization is believed to take place through the unsaturated group in the allyl radical. If allylphenylsilicon diethoxide is mixed with about 1% of a catalyst, such as benzoyl peroxide, and heated on a flat surface at about 100° C., a hard transparent film will be produced in a short period of time. Likewise, the allylphenylsilicon ethoxide may be polymerized with other resin-forming substances, such as allylphthalate and the like. An advantageous property of these films is their resistance to hydrocarbon solvents.

Products which are potentially more useful than the ethoxide polymers may be produced by first hydrolyzing the allylphenylsilicon ethoxides to form the corresponding silicols which then can be dehydrated and condensed to form the corresponding organo-silicon oxide polymers. The following equations are believed to represent the successive hydrolysis and dehydration reactions using allylphenylsilicon diethoxide as the initial material.

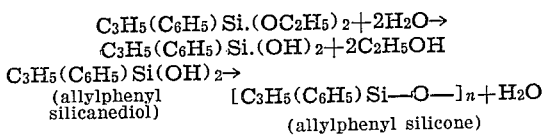

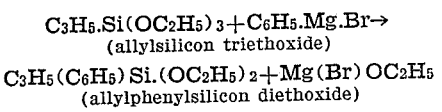

The allylphenyl silicols readily condense during dehydration to form resinous products by elimination of a molecule of water between two hydroxyl groups to produce alternate silicon-oxygen bonds. In general, the more complete the dehydration, the larger are the polymeric groups. The dehydration is preferably carried out in the presence of a dehydrating agent, particularly materials capable of absorbing or chemically combining with water. Boric acid esters, such for example as methyl borate, metal halides, the oxides and halides of phosphorus, sulphuric acid and hydrochloric acid have been found to be suitable dehydrating agents.

For subsequent application and use, the allylphenyl silicols are dehydrated and condensed to form low polymers which are low viscosity fluids and are solvent soluble. Thick gummy masses or solids result as condensation is prolonged.

In the presence of catalysts and heat, hard polymeric bodies are eventually produced. These bodies are suitable for many applications due to their hardness, insolubility and heat resistance. The nature of the products produced by the polymerization reaction with the formation of silicon-oxygen bonds is greatly determined by the kind and proportion of hydrolyzable groups present in the silicon compound being converted to the polymers. Thus the triethoxides form three dimensional polymers and the diethoxides form linear polymers while the monoethoxides have only one silicon-oxygen bond and therefore tend to terminate a polymer chain. A mixture containing a high proportion of the monoethoxide will tend to produce relatively small silicon polymer units. A large proportion of the triethoxide will tend to the formation of solid, cross-linked polymers of low thermoplasticity.

For many applications a flexible solid polymer is preferred. Organo-silicon oxide polymers which are flexible solids when fully polymerized are characterized by a large proportion of unit molecules having two relatively non-hydrolyzable organic groups attached to the silicon atom. In actual practice, the silicon oxide polymers are usually composed of mixtures of two or more different compounds. By proper proportioning of the components of the mixtures, there is available a wide selection of properties.

A decided advantage obtained by employing the allylphenyl silicon oxides is the great reduction in time and temperature required to polymerize the low polymers to the higher solid polymers. Less time is required at 120° C. to polymerize an allylphenyl silicon oxide to a solid state than is necessary to polymerize a dimethyl silicon at 250° C. to the same state.

The allylphenyl silicon oxides polymerized to a flexible solid state or harder condition are not appreciably affected by oils, greases, hydrocarbon solvents, water and the like. Prolonged immersion in toluene does not produce any significant change in size or strength.

An outstanding property of the allylphenyl silicon oxides of this invention is that they have been found to overcome many of the shortcomings of saturated organosilicon oxides. Further they produce unexpected and highly desirable results when combined with the saturated organic silicon oxides. The solid polymeric products of the methyl silicon oxides, ethyl silicon oxides, phenyl methyl silicon oxides, phenyl ethyl silicon oxides, and similar saturated alkyl and aryl organosilicon oxide compounds have been greatly improved in their physical and chemical properties by the addition of small amounts of the allylphenyl silicon oxides, particularly when combined so that interpolymers are formed. Siloxane interpolymers containing from 0.1% to 10% by weight of allylphenyl silicon compound form flexible resinous bodies such as films, coatings, sheets and the like, characterized by extraordinary heat stability, resistance to hydrocarbon solvents, oils and water and resistance to deterioration from oxygen and other usually harmful substances. In other cases, as much as 50% of the weight of the siloxane interpolymers may be composed of allylphenyl silicon oxide with highly advantageous results. The allylphenyl silicon oxides enable cross-linking through the unsaturated group in the allyl radical whereby the molecules are linked by strong primary valence forces.

The saturated organosilicon component of the interpolymers may be derived from a saturated organic silicon compound having the unit structure $R_xSiY_{(4-x)}$ where R is a saturated alkyl or aryl radical, $x$ has a value from 1 to 3 and Y is a halide, ethoxyl or other hydrolyzable group. Subsequent hydrolysis and dehydration will produce the silicon oxide polymer. The saturated organosilicon component may be a mixture of several alkyl or aryl compounds depending on the requirements. Likewise the component may comprise a mixture of two or more isomers. Therefore $x$ may have a value other than a whole number. For producing the more flexible interpolymers, it is preferred to have a predominant proportion of the saturated compound in which $x$ is 2.

The interpolymers may be prepared by admixing the separate saturated organic siloxane with the allylphenyl siloxane either when both are liquids of a low degree of polymerization, or solutions of either or both in a solvent may be mixed together. It is believed that better results are obtained, however, if the saturated organosilicon ethoxides are admixed with the allylphenylsilicon ethoxides (or the corresponding silicon halides) and hydrolysis and dehydration is carried out upon the combination. The following are typical examples of the procedure:

*Example 3*

To a mixture of 146.5 g. (0.99 mole) of dimethylsilicon diethoxide and 2.4 g. (0.01 mole) of allylphenylsilicon diethoxide there was added 100 cc. of 5 per cent sulfuric acid, dropwise with stirring, over a period of one hour. The resulting siloxane layer was separated and stirred for one hour at room temperature with 100 cc. of 75% sulfuric acid. The mixture was diluted by addition of chipped ice—then 500 cc. of water was added and the acid layer was withdrawn. The liquid silicon oxide polymer was taken up in toluene, washed thoroughly with water, and then dried over anhydrous calcium chloride. Removal of the solvent left a low molecular weight interpolymeric oily fluid of a viscosity of 537 centistokes at 28° C. In this example the R to Si ratio is 2, and the allyl groups constitute 0.5% of the total number of hydrocarbon groups.

The oily interpolymer of Example 3 was applied to members as a coating and heat treated at a temperature of 200° C. for six hours in order to fully harden and dry the organo-silicon oxide resin by further polymerization. These coatings embodied $\frac{1}{10}$ of 1% of a metal chelate compound and contained 3% tertbutyl perbenzoate as a catalyst. When subjected to heating at 200° C. the coatings had not cracked or separated from the base members after more than 3000 hours.

*Example 4*

A mixture of 132.2 grams of dimethylsilicon diethoxide (0.892 mole) and 23.7 grams of allylphenylsilicon diethoxide (0.100 moles) was admixed and 100 cc. of 5% sulfuric acid was added dropwise with stirring over a period of time of one hour. A layer of the silicon oxide compound was recovered. The layer was treated with 100 cc. of 75% sulfuric acid for one hour at room temperature. Successive additions of ice and 500 cc. of water separated the acid and the silicone, permitting separation from the acid layer. The addition of toluene to the siloxane took it up. After removal of the last traces of water, an oily, fluid silicone oxide interpolymer was obtained having a viscosity of 174 centistokes at 125° C. The interpolymer was composed of approximately 10% by weight of the allyphenyl siloxane. Coatings of the oily siloxane interpolymer dried to a hard film in six hours at temperatures of about 200° C. In this polymer the proportion of allyl groups is 5% of the total number of hydrocarbon groups, and the R to Si ratio is 2.

*Example 5*

A mixture of 72.2 grams of dimethylsilicon diethoxide (0.487 mole), 133.5 grams of methylsilicon triethoxide (0.75 mole) and 3 grams of allylphenylsilicon diethoxide (0.013 mole) in 565 cc. of toluene was hydrolyzed with 5% sulfuric acid. The toluene layer which separated was withdrawn and stirred with half its volume of 75% sulfuric acid for fifteen minutes at room temperature. After diluting with ice and water, a toluene layer containing the siloxane separated out. The toluene solution of the siloxane was concentrated by distillation whereby a heavy varnish-like liquid containing approximately 75% solids was produced. The varnish when applied to members as a coating dried in five hours at a temperature of 250° C. to a hard tack-free film. In this example, the R to Si ratio is 1.4, and the allyl groups constitute about 0.74% of the total number of hydrocarbon groups.

The allylphenyl silicon compounds of this invention form excellent interpolymers when combined with phenylmethyl silicon compounds. The phenylmethyl-allylphenyl siloxane interpolymers will give compositions having properties similar to the allylphenyl-methyl siloxane interpolymers in the previous examples.

In order to confer additional fire and flame resistance to the siloxane polymers and interpolymers described, chlorinated and fluorinated phenyl groups may be incorporated for producing allylhalophenyl siloxanes.

In applying the allylphenyl silicon oxide polymers or interpolymers thereof to various base members and particularly to porous or fibrous materials, such as glass fibers or asbestos, it is advantageous to employ the polymers that are quite viscous but not solvent insoluble. These intermediate polymers can be dissolved in a hydrocarbon solvent, for example, toluene, to produce a low viscosity solution that will readily penetrate the porous materials and on heating the solvent evaporates leaving the silicon oxide polymer distributed in and on the base member. Loss of silicon oxide resin by dripping is minimized due to its relatively high viscosity. Also there is less time required to fully polymerize the intermediate polymer than would be required if the siloxane were less fully polymerized when applied. The low siloxane polymers, either the allylphenyl silicon oxides or interpolymers thereof, need not be dissolved in a solvent, but may be dispersed or emulsified in a volatile liquid carrier such as water. For this purpose the water is rendered alkaline with ammonia, for example, and a dispersing agent added, such for instance as a sodium alkyl sulfonate ester. Hydrolyzed polyvinyl esters and a simple alcohol, such as ethyl alcohol, may be present in small amounts in the water to facilitate dispersion of the siloxane polymer and to render the dispersion more stable. The fluid silicon oxide polymer admixed with the water and the conditioning agents is passed through a suitable dispersing device such, for example, as a gear pump or colloid mill, to break up the siloxane into finely divided particles and to establish a stable emulsion. Upon heat-treatment of the dispersion, the liquid carrier volatilizes leaving essentially siloxane polymer. There is a reduction in fire hazard by employing water dispersions of the polymers.

The flexible and harder solid interpolymers of the allylphenyl and saturated organic silicon compounds are resistant to the action of oils, hydrocarbon solvents and other organic materials that deteriorate the saturated organic siloxanes. The interpolymers of this invention do not swell or soften appreciably even after many days immersion in toluene or other hydrocarbon. Furthermore, the interpolymers described herein are greatly resistant to moisture. Electrical insulation prepared therefrom maintains a high resistivity even after the polymers have been immersed in water for long periods of time.

Accordingly, the allyl phenyl silicon oxide interpolymers of this invention are particularly suitable for preparation of electrical insulation. Members prepared by molding or coating the interpolymers, with or without machining or shaping, may be used in electrical apparatus. Various insulating materials, such as panels, spacers, sheets, coatings and the like may be prepared from solids such as asbestos fabrics, glass fabrics, and other inorganic fibrous materials and powders, such for example, as glass, silica, bentonite and the like treated with the siloxane interpolymers. The siloxane interpolymers may be applied to the solids as low viscosity fluids or in solution in solvents or as a dispersion or emulsion in a liquid carrier, and polymerized with heat and catalyst.

Referring to Figure 1 of the drawing, there is illustrated a laminated member 10 composed of a plurality of sheets 12, preferably of an inorganic material, impregnated and bonded with the allylphenyl silicon oxide polymers or interpolymers to withstand high temperatures. The sheets 12 may be composed of a glass cloth, asbestos cloth, metal fabric or sheets of bentonite or other sheet material or combinations thereof. It is obvious that where high temperatures are not critical, that the sheets 12 may be composed of paper, wood, cotton cloth or the like treated with the siloxane interpolymers. The silicon oxide interpolymers dissolved in a solvent or dispersed in a liquid carrier to produce a low viscosity solution or medium capable of impregnating porous materials may be applied initially to the individual sheets 12. The impregnated sheets are then dried to remove the solvent or liquid carrier. The siloxane treated sheets may then be stacked upon one another until a predetermined thickness is obtained and the entire assembly compressed and subjected to heat treatment. Several hours' heat treatment at temperatures of the order of 200° C. are required in order to completely polymerize the interpolymers whereby to produce a member suitable for use. The members 10 may be subjected to cutting or machining to prepare therefrom members of a suitable size and shape for the intended purpose.

Referring to Fig. 2 of the drawing, there is illustrated the application of the allylphenyl silicon oxide polymers or the interpolymers of this invention to an electrical conductor 22 to provide an insulating coating 24 thereon. The conductor 22 may be a copper wire, iron wire or an alloy resistance wire of any predetermined shape or form such as solid or stranded wire. In some cases, carbon or graphitic conducting members may be treated with the insulating siloxane coating. In preparing the insulated conductor 20, the metal wire 22 may be dipped into a solution or dispersion of the siloxane interpolymer, and when subjected to elevated temperatures in a baking oven, the solvents or liquid carrier is evaporated and the interpolymer polymerized into a flexible insulating coating.

In many cases it is desirable initially to apply a solid or fibrous covering to a conductor and to impregnate the solid or fibrous covering with a resinous allylphenyl silicon oxide polymer or interpolymer binder to improve the insulating characteristics and to increase the adherence of the fibrous material to the conductor. Referring to Fig. 2 of the drawing, there is shown an insulated conductor 26, comprising a conductor 22, covered with the fibrous material 28, treated with the allylphenyl siloxane. An inorganic fibrous material is preferably employed. Suitable inorganic fibrous materials are asbestos fibers or glass fibers either felted or wrapped about the conductor 22. The fibrous materials may consist of separate continuous filaments, silver, yarn, tape or the like.

High temperature electrical apparatus may be built by employing therein the allylphenyl silicon oxide polymers and interpolymers of this invention for the conductor insulation.

Fig. 4 of the drawing illustrates the application of the allylphenyl siloxane polymers or interpolymers thereof to a dynamo-electric machine capable of use at elevated temperatures. The stator 30 of a motor or generator, for example, comprises a plurality of laminations of magnetic material provided with a plurality of slots 32. The slots 32 are so machined that a narrow opening 34 is provided at the top to permit the introduction of conductors and the like to form a coil and to facilitate retaining such coil in the slots. Slot cell liners 36 prepared from an inorganic material, such, for example, as glass fiber cloth coated with an allylphenyl siloxane interpolymer, are placed within the slots 32. Coils 38 and 40 are wound within the slot cell 32 lined with the insulating liner 36 according to the conventional practice. The conductors of the coils 38 and 40 are insulated with the allylphenyl siloxane interpolymer described herein. The phase insulating separator 42 and the liner strip 44 may be made in a manner similar to the slot cell liner 36 and applied to insulate the coils 38 and 40 from the rest of the apparatus. A wedge 46, which may be prepared from suitable inorganic materials, or, in some cases, from glass fiber cloth impregnated with the polymeric resins of this invention containing, for example, about 40% allylphenyl siloxane polymerized to shape under pressure, is driven into the top of the slot to retain the coils in their predetermined position.

In preparing polymeric bodies from the allylphenylsilicon ethoxides as well as the allylphenyl silicon oxides and interpolymers thereof, it may be desirable in many instances to embody therein finely divided inorganic materials, such, for example, as silica flour, bentonite, mica dust, glass powders, calcium fluoride, ceramic powders and the like. A paste or thick liquid may be prepared from the silicon compound by incorporating a suitable amount of pulverized inorganic powder—for example, up to 50% by weight of the whole. The paste may be applied as a filler to electrical coils and other electrical apparatus. Upon heat treatment, with or without a polymerizing catalyst, a hard, dense, solvent-resistant mass will be obtained.

For making high-temperature mica insulation, the siloxane interpolymer embodying a proportion of allylphenylsilicon compound may be applied to mica flakes as a binder. The siloxane interpolymer solution or dispersion is applied and thereafter sheets or bodies built up therefrom are heated under pressure to remove the solvent or liquid carrier, to shape and to complete polymerization of the siloxane into a hard, solvent-resistant state. Referring to Fig. 5 of the drawing, there is illustrated a sheet composed of mica flakes bonded by means of the copolymers or interpolymers having allyl and phenyl groups attached to silicon atoms. The mica sheet may be prepared with a backing of an inorganic fibrous material such, for example, as glass fibers or asbestos in fabric form.

The several polymerizable allylsilicon compounds described herein may be combined with finely divided graphite, anthracite coal or coke, and either coal coke or petroleum coke which has been heat treated at 500° C. to 700° C., to produce semiconducting paints and varnishes. Such paints and varnishes are particularly useful for application to generators and other high voltage apparatus operating above 6900 volts to reduce or eliminate the generation of corona thereon. Both the anthracite coal and coke are stable at temperatures of 200° C. to 300° C. or even higher.

Since certain changes in carrying out the above processes and certain modifications in the apparatus and applications embodying the materials produced by the processes of the invention may be made without departing from its scope, it is intended that all the matter contained in the above description or shown in the accompanying drawings shall be interpreted as illustrative and not in a limiting sense.

We claim as our invention:

1. A polymerizable monovalent hydrocarbon substituted polysiloxane containing an average of from about 1.4 to 2 hydrocarbon groups per silicon atom, the hydrocarbon groups being directly attached to silicon by carbon-silicon bonds, wherein the hydrocarbon groups consist of (a) allyl and phenyl groups both attached to each of a portion of the silicon atoms and (b) at least one monovalent radical selected from the group consisting of methyl and phenyl radicals attached to other silicon atoms, and wherein the allyl groups comprise from about ½% to 5% of the total number of the silicon bonded hydrocarbon groups.

2. A composition of matter comprising a heat-treated monovalent hydrocarbon substituted polysiloxane wherein the hydrocarbon radicals consist of (a) allyl and phenyl radicals both linked directly to each of a portion of the silicon atoms by carbon to silicon linkages and (b) at least one radical selected from the group consisting of methyl and phenyl radicals linked to the remaining silicon atoms by carbon to silicon linkages, the allyl radicals comprising from about ½% to 5% of the total number of the silicon bonded hydrocarbon radicals, the polysiloxane containing an average of from about 1.4 to 2 silicon bonded hydrocarbon radicals per silicon atom, the heat-treated polysiloxane being characterized by both siloxane linkages and cross-linkages through reaction between allyl groups.

3. A polymerizable monovalent hydrocarbon substituted polysiloxane containing an average of from about 1.4 to 2 hydrocarbon groups per silicon atom, the hydrocarbon groups being directly attached to silicon by carbon-silicon bonds, wherein the hydrocarbon groups consist of (a) allyl and aryl radicals both attached to each of a portion of the silicon atoms, the aryl radicals being selected from the group consisting of phenyl, chlorine substituted phenyl, fluorine substituted phenyl and monovalent alkyl substituted phenyl radicals, and (b) at least one monovalent radical selected from the group consisting of methyl and phenyl radicals attached to other silicon atoms, and wherein the allyl groups comprise from about ½% to 5% of the total number of the silicon bonded hydrocarbon groups.

4. A composition of matter comprising a heat-treated monovalent hydrocarbon substituted polysiloxane wherein the hydrocarbon radicals consist of (a) allyl and phenyl radicals both linked directly to each of a portion of the silicon atoms by carbon to silicon linkages and (b) monovalent aryl and saturated alkyl radicals linked to the remaining silicon atoms by carbon to silicon linkages, the allyl radicals comprising from about ½% to 5% of the total number of the silicon bonded hydrocarbon radicals, the polysiloxane containing an average of from about 1.4 to 2 silicon bonded hydrocarbon radicals per silicon atom, the heat-treated polysiloxane being characterized by both siloxane linkages and cross-linkages through reaction between allyl groups.

5. A solid composition comprising an organosiloxane interpolymer composed of between 0.1% and 10% by weight of allylaromaticsiloxane units derived by hydrolyzing and condensing an organosilicon compound having the formula

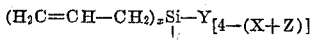

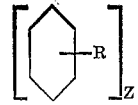

where R represents at least one monovalent radical selected from the group consisting of hydrogen, saturated alkyl, chlorine and fluorine radicals, Y represents a monovalent hydrolyzable radical selected from the group consisting of chlorine and ethoxyl radicals, X and Z each represent a number from 1 to 2, the total of X and Z not exceeding 3, and the balance being an organosiloxane derived by hydrolyzing and condensing an organosilicon compound having the average formula

where $R^1$ represents a monovalent radical selected from the group consisting of saturated alkyl and aryl radicals, and $n$ represents a number from 1 to 2, at least the condensation being effected while the two silicon compounds are intermixed and the condensed product being heated to provide for crosslinkages through the allyl groups.

6. A member comprising a base and an applied solid organosiloxane interpolymer comprising the heat-treated product of an organosiloxane interpolymer composed of between 0.1% and 10% by weight of allylaromaticsiloxane units derived by hydrolyzing and condensing an organosilicon compound having the formula

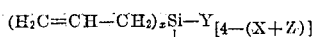
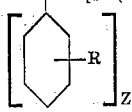

where R represents at least one monovalent radical selected from the group consisting of hydrogen, saturated alkyl, chlorine and fluorine radicals, Y represents a monovalent hydrolyzable radical selected from the group consisting of chlorine and ethoxyl radicals, X and Z each represent a number from 1 to 2, the total of X and Z not exceeding 3, and the balance being an organosiloxane derived by hydrolyzing and condensing an organosilicon compound having the average formula

where $R^1$ represents a monovalent radical selected from the group consisting of saturated alkyl and aryl radicals, and $n$ represents a number from 1 to 2, at least the condensation being effected while the two silicon compounds are intermixed and the condensed product applied to the base and then being heated to cause addition polymerization between the allyl groups, the solid interpolymer having both Si—O—Si linkages and cross-linkages derived through the allyl groups.

7. An insulated electrical conductor comprising an electrical conductor and insulation applied to the conductor comprising a solid organosiloxane interpolymer comprising the heat-treated product of an organosiloxane interpolymer composed of between 0.1% and 10% by weight of allylaromaticsiloxane units derived by hydrolyzing and condensing an organosilicon compound having the formula

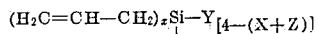
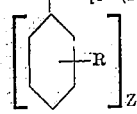

where R represents at least one monovalent radical selected from the group consisting of hydrogen, saturated alkyl chlorine and fluorine radicals, Y represents a monovalent hydrolyzable radical selected from the group consisting of chlorine and ethoxyl radicals, X and Z each represent a number from 1 to 2, the total of X and Z not exceeding 3, and the balance being an organosiloxane derived by hydrolyzing and condensing an organosilicon compound having the average formula

where $R^1$ represents a monovalent radical selected from the group consisting of saturated alkyl and aryl radicals, and $n$ represents a number from 1 to 2, at least the condensation being effected while the two silicon compounds are intermixed and the condensed product applied to the base and then being heated to cause addition polymerization between the allyl groups, the solid interpolymer having both Si—O—Si linkages and cross-linkages derived through the allyl groups.

JACK SWISS.
CLYDE E. ARNTZEN.

REFERENCES CITED

The following references are of record in the file of this patent:

UNITED STATES PATENTS

| Number | Name | Date |
|---|---|---|
| 2,258,219 | Rochow | Oct. 7, 1941 |
| 2,258,220 | Rochow | Oct. 7, 1941 |
| 2,258,222 | Rochow | Oct. 7, 1941 |
| 2,377,689 | Hyde | June 5, 1945 |
| 2,386,793 | Hanford | Oct. 16, 1945 |
| 2,397,727 | Daudt | Apr. 2, 1946 |
| 2,436,304 | Johannson | Feb. 17, 1948 |
| 2,457,677 | Hyde | Dec. 28, 1948 |
| 2,465,296 | Swiss | Mar. 22, 1949 |
| 2,465,731 | Kropa | Mar. 29, 1949 |
| 2,486,162 | Hyde | Oct. 25, 1949 |

OTHER REFERENCES

Hurd, Journal American Chemical Society, October 1945, pp. 1813 and 1814.